United States Patent
Dalcher

(10) Patent No.: US 9,189,363 B2
(45) Date of Patent: Nov. 17, 2015

(54) SYSTEM, METHOD, AND COMPUTER PROGRAM PRODUCT FOR MONITORING AN EXECUTION FLOW OF A FUNCTION

(75) Inventor: Gregory William Dalcher, Tigard, OR (US)

(73) Assignee: McAfee, Inc.

( * ) Notice: Subject to any disclaimer, the term of this patent is extended or adjusted under 35 U.S.C. 154(b) by 1291 days.

(21) Appl. No.: 12/900,393

(22) Filed: Oct. 7, 2010

(65) Prior Publication Data

US 2013/0275981 A1  Oct. 17, 2013

(51) Int. Cl.
H04L 29/06 (2006.01)
G06F 21/00 (2013.01)
G06F 11/34 (2006.01)

(52) U.S. Cl.
CPC ...... *G06F 11/3466* (2013.01); *G06F 2201/865* (2013.01)

(58) Field of Classification Search
CPC ....... G06F 21/00; G06F 21/56; G06F 21/566; G06F 21/577; G06F 12/14
USPC .......................................................... 726/24
See application file for complete search history.

(56) References Cited

U.S. PATENT DOCUMENTS

| 7,302,550 | B1 * | 11/2007 | Merck ........................... 712/202 |
| 7,496,786 | B2 * | 2/2009 | Graham et al. .................. 714/12 |
| 8,307,432 | B1 * | 11/2012 | Feng ................................ 726/22 |
| 2006/0037075 | A1 * | 2/2006 | Frattura et al. .................. 726/22 |
| 2006/0037078 | A1 * | 2/2006 | Frantzen et al. ................. 726/23 |
| 2006/0200677 | A1 * | 9/2006 | Marinescu ..................... 713/182 |
| 2007/0204257 | A1 * | 8/2007 | Kinno et al. ................... 717/100 |
| 2009/0089764 | A1 * | 4/2009 | Lai et al. ........................ 717/143 |
| 2010/0088705 | A1 * | 4/2010 | Attinella et al. ............... 718/102 |
| 2010/0146615 | A1 * | 6/2010 | Locasto et al. .................. 726/11 |
| 2010/0205674 | A1 * | 8/2010 | Zorn et al. ....................... 726/25 |

OTHER PUBLICATIONS

U.S. Appl. No. 12/111,851, filed Apr. 29, 2008.
U.S. Appl. No. 11/857,373, filed Sep. 18, 2007.
U.S. Appl. No. 12/042,923, filed Mar. 5, 2008.
U.S. Appl. No. 12/202,952, filed Sep. 2, 2008.
U.S. Appl. No. 12/415,641, filed Mar. 31, 2009.
U.S. Appl. No. 11/749,635, filed May 16, 2007.

* cited by examiner

*Primary Examiner* — Lisa Lewis
(74) *Attorney, Agent, or Firm* — Blank Rome LLP

(57) ABSTRACT

A system, method, and computer program product are provided for monitoring an execution flow of a function. In use, data associated with a function is identified within a call stack. Additionally, a call stack frame is determined from freed memory in the call stack. Further, an execution flow of the function is monitored, utilizing the call stack frame from the freed memory.

18 Claims, 5 Drawing Sheets

# SYSTEM, METHOD, AND COMPUTER PROGRAM PRODUCT FOR MONITORING AN EXECUTION FLOW OF A FUNCTION

FIELD OF THE INVENTION

The present invention relates to monitoring system activity, and more particularly to behavioral monitoring and analysis.

BACKGROUND

Traditionally, security software may depend on the ability to widely monitor system activity. This may be particularly important for behavioral analysis methods for detecting malicious activity. One useful component of this monitoring may include monitoring the flow of software execution. For example, security software may monitor execution flow in order to determine if code involved in handling a monitored operation is trusted and expected to be involved in the handling of the operation. However, traditional methodologies for monitoring software execution flow have generally exhibited various limitations.

For example, the ability to monitor the flow of software execution is often limited. For instance, in particular versions of operating systems, the use of interface hooking may be prohibited in the kernel. Additionally, in another example, there may be a performance impact of applying a necessary level of monitoring in order to assemble an execution flow profile. There is thus a need for addressing these and/or other issues associated with the prior art.

SUMMARY

A system, method, and computer program product are provided for monitoring an execution flow of a function. In use, data associated with a function is identified within a call stack. Additionally, a call stack frame is determined from freed memory in the call stack. Further, an execution flow of the function is monitored, utilizing the call stack frame from the freed memory.

DETAILED DESCRIPTION

Figure 1:
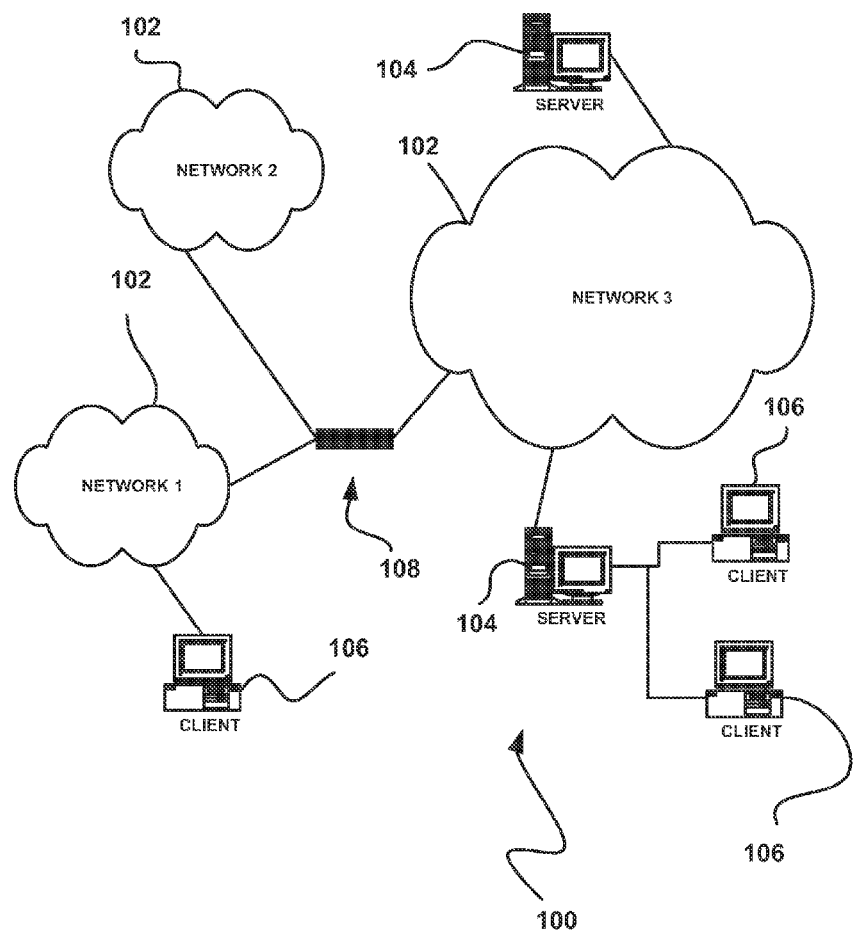
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
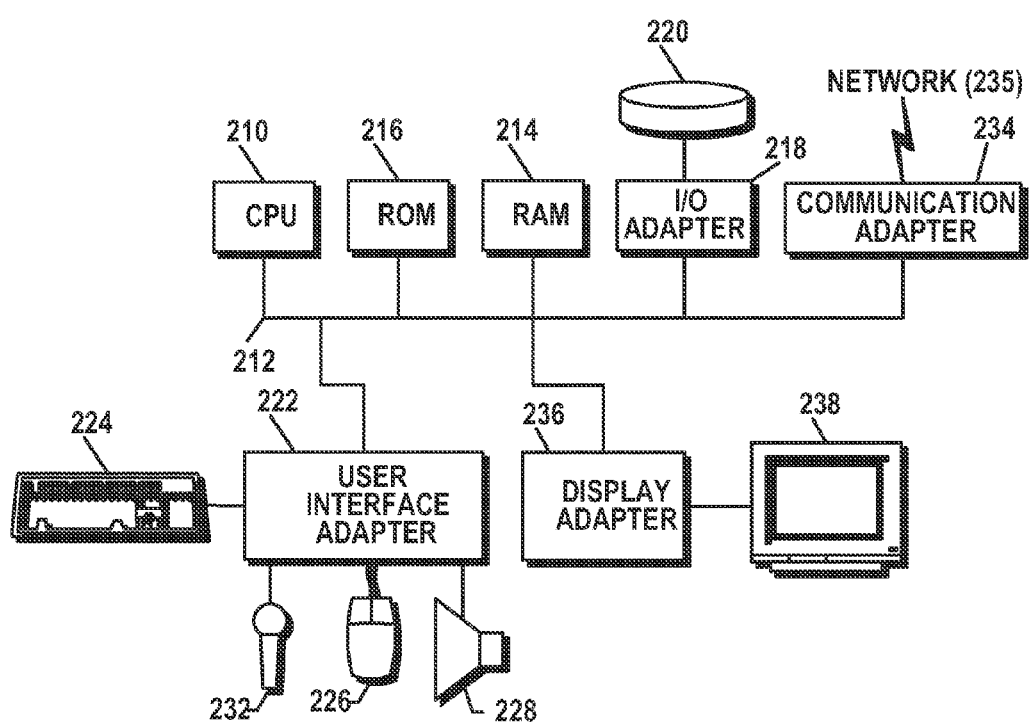
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
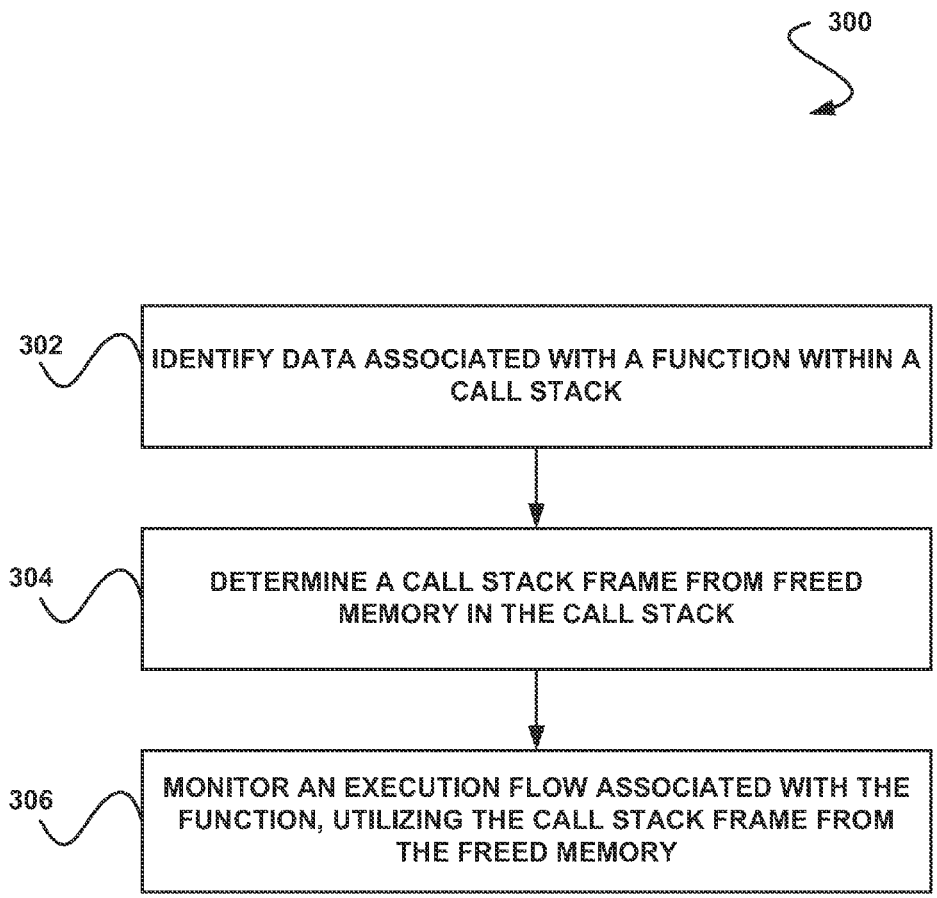
FIG. 3 shows a method for monitoring an execution flow of a function, in accordance with another embodiment.

FIG. 3 shows a method 300 for monitoring an execution flow of a function, in accordance with another embodiment. As an option, the method 300 may be carried out in the context of the architecture and environment of FIGS. 1 and/or 2. Of course, however, the method 300 may be carried out in any desired environment.

As shown in operation 302, data associated with a function is identified within a call stack. In one embodiment, the function may be associated with an instance of software. For example, the function may include a subroutine of the software (e.g. an active subroutine of the software, etc.). Additionally, in one embodiment, the call stack may include any data structure that stores the data associated with the function. For example, the call stack may include a plurality of entries, where one or more entries are associated with an action performed by the function.

In yet another embodiment, the data may include any information within the call stack that is associated with the function. For example, the data may include an entry (e.g., a frame, etc.) in the call stack. In one embodiment, the entry may include a return address, and the return address may identify the function that pushed the entry onto the call stack. In another embodiment, the entry may include a snapshot of a state associated with the function. For example, the entry may include one or more preserved local variables, one or more spaces reserved in the call stack for variables, one or more registers, etc.

Additionally, in one embodiment, the data associated with a function may be associated with an event. For example, the data may be identified within the call stack as the result of generating a test event (e.g., a trace event. etc.). For instance, a test event may be generated in order to determine one or more functions that are involved with a call stack associated with the test event (e.g., by identifying one or more functions that push or pop one or more entries onto the call stack associated with the test event, etc.).

Further, in another embodiment, the data associated with the function may be identified by monitoring the call stack. For example, hooking based monitoring of the call stack may be used to identify the data associated with the function. In yet another embodiment, the monitoring of the call stack may be dynamically adjusted. Of course, however, the monitoring may be performed in any manner.

Further still, as shown in operation 304, a call stack frame is determined from freed memory in the call stack. In one embodiment, the call stack frame may be associated with a stack entry. For example, the call stack frame may include memory in the stack that previously held an active stack entry. In another example, an entry that is pushed onto the stack may become the call stack frame in the freed memory in the stack when the entry is popped from the stack. In another embodiment, the call stack frame may include memory outside of that dictated by the call stack (e.g., an external call stack frame, etc.). For example, the call stack frame may include memory outside (e.g., below, etc.) a stack pointer associated with the call stack.

In addition, in one embodiment, the call stack frame may be associated with a first call stack entry of the function. For example, the function may push a first call stack entry onto the call stack, and the first call stack entry may then be popped (e.g., by another function, etc.), where the popped first call stack entry becomes the call stack frame in freed memory in the stack. In another embodiment, the call stack frame may be associated with a second call stack entry of the function. For example, after the first call stack entry is popped, the function may push a second call stack entry onto the call stack, where the memory used to store the second call stack entry includes the call stack frame.

Also, as shown in operation 306, an execution flow of the function is monitored, utilizing the call stack frame from the freed memory. In one embodiment, monitoring the execution flow of the function may include monitoring the call stack frame from the freed memory in the call stack. For example, a monitoring point (e.g., a hook, etc.) may be placed on the call stack frame. In another example, the monitoring point may identify code involved in the handling of the test event. In yet another embodiment, the monitoring of the execution flow of the function may be dynamically adjusted, based on the call stack frame. For example, monitoring the execution flow of the function may include enabling additional monitoring, based on an analysis of the call stack frame.

Furthermore, in another embodiment, it may be determined whether the call stack frame has been compromised. For example, it may be determined whether the contents of the call stack frame have been overwritten by a second call stack entry subsequent to a first call stack entry in the call stack frame. In another embodiment, the determination whether the call stack frame has been compromised may include examining code associated with the call stack frame (e.g., code preceding a return address in the call stack frame, etc.). In yet another embodiment, a level of confidence associated with the call stack frame may be determined. Further, in one embodiment, it may be determined whether the call stack frame is compromised, based on the level of confidence.

Further still, in yet another embodiment, the call stack frame may not be monitored if the call stack frame is determined to be compromised. In another embodiment, the call stack frame may be monitored if the call stack frame is determined to be not compromised. Additionally, data associated with the function within the call stack may again be identified, utilizing the call stack frame from freed memory in the call stack. In another embodiment, the execution flow of the function may be monitored for malware. Of course, however, the execution flow of the function may be monitored for any purpose.

In this way, monitoring the execution flow of the function may not be limited by a current call stack window, and may take advantage of freed memory in the call stack. Additionally, confidence may be established that data in freed memory in the call stack has not been overwritten. Further, the monitoring may allow for determining if a handling of events is performed by expected and trusted software. For example, a generated keystroke test event may be expected to be handled only by a subset of OS-supplied software. If the monitoring indicates that that other software was involved in this handling, one or more actions may be taken. For example, the monitoring could flag the involvement as outside allowed system operations, possibly indicating a presence of malicious software, etc. In another example, the system may be subjected to additional scrutiny (e.g., enhanced monitoring, full scans, audits, etc.) in order to attempt to locate any malicious software that is present. In yet another example, the system may be placed in a quarantine area until the system is confirmed cleaned of malicious software.

Figure 4:
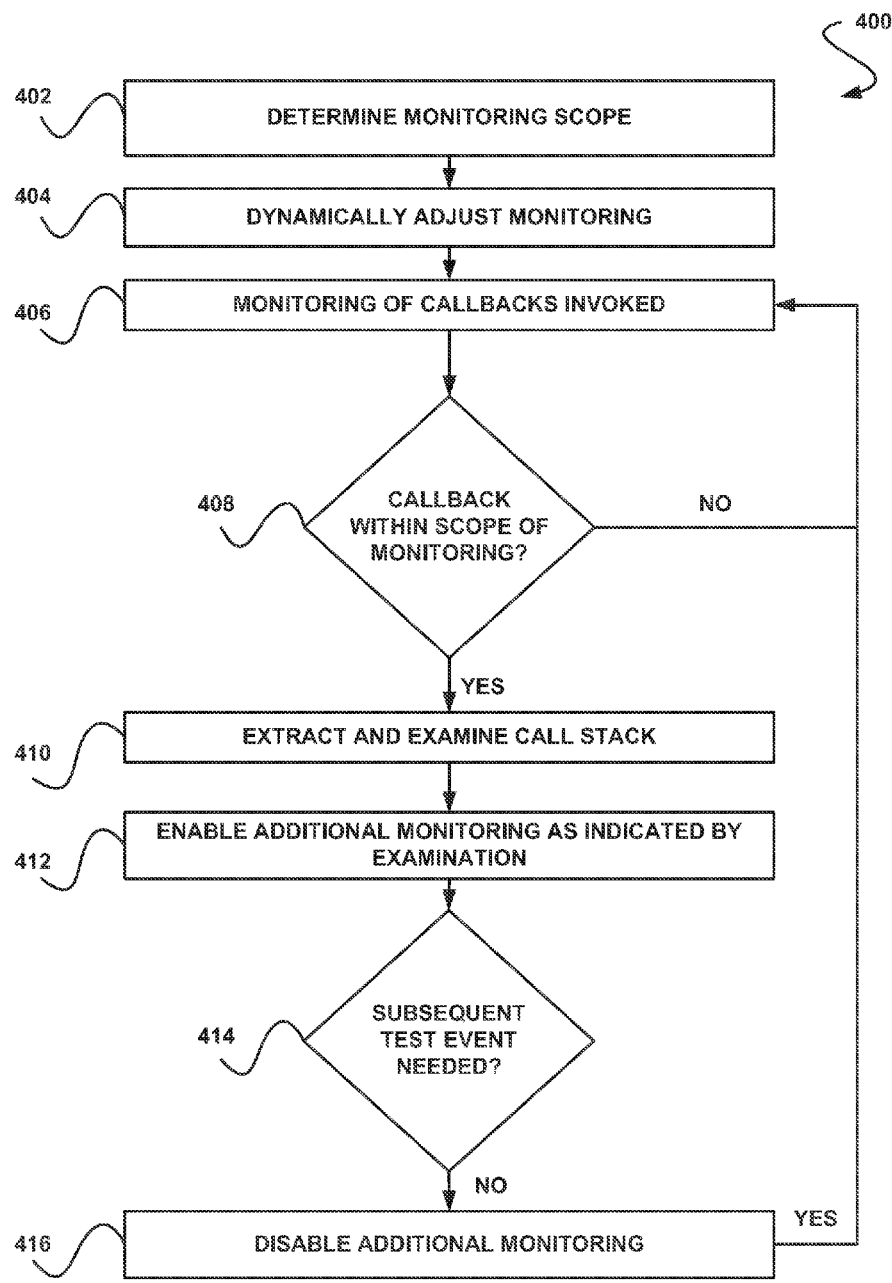
FIG. 4 shows a method for performing execution flow monitoring using enhanced call stack analysis, in accordance with yet another embodiment.

FIG. 4 shows a method 400 for performing execution flow monitoring using enhanced call stack analysis, in accordance with another embodiment. As an option, the method 400 may be carried out in the context of the architecture and environment of FIGS. 1-3. Of course, however, the method 400 may be carried out in any desired environment.

As shown in operation 402, a scope of monitoring to be performed is determined. In one embodiment, determining the scope of the monitoring may include generating a test event. For example, a test event may be generated, and the monitoring may be limited to the handling of the test event. In this way, the test event may artificially induce a limited scope, and may thereby enable a simpler identification of events associated with the scope. In another embodiment, the test event may be associated with a specific thread, and handling of the test event may occur within the thread.

Additionally, as shown in operation 404, the monitoring is dynamically adjusted. In one embodiment, the monitoring may be adjusted according to the determination of the scope of the monitoring. Additionally, see, for example, U.S. patent application Ser. No. 12/111,851 filed Apr. 29, 2008, which is hereby incorporated by reference in its entirety, and which describes dynamically adjusted systems monitoring and test/trace events. In one embodiment, an optional test event may be used in association with dynamically adjusting the monitoring.

Further, as shown in operation 406, monitoring of callbacks is invoked. For example, monitoring may be invoked for callbacks that are identified as a result of the dynamic adjustments. Additionally, see, for example, U.S. patent application Ser. No. 11/857,373 filed Sep. 18, 2007, and U.S. patent application Ser. No. 12/042,923 filed Mar. 5, 2008, which are hereby incorporated by reference in its entirety, and which describe methods for determining origins of code. Further, see, for example, U.S. patent application Ser. No. 12/202,952 filed Sep. 2, 2008, which is hereby incorporated by reference in its entirety, and which describes an exemplary behavioral detection infrastructure. Further still, see, for example, U.S. patent application Ser. No. 12/415,641 filed Mar. 31, 2009, which is hereby incorporated by reference in its entirety, and which describes exemplary use of an early boot environment for early systems monitoring.

In one embodiment, the monitoring may include operating system supported monitoring. For example, the monitoring may include the use of filter drivers (e.g., file system filters, etc.), event callbacks (e.g. registry monitoring callbacks, etc.), etc. In another embodiment, the monitoring may include the use of code hooking. For example, the monitoring may include modifying code to be monitored so that it transfers control to a callback when executed. In yet another embodiment, the monitoring may include the use of central processing unit (CPU) debugging extensions. For example, a limited number of CPU-based monitors may be registered to invoke callbacks when indicated code is executed. Also, in still another embodiment, the monitoring may include the use of virtualization extensions. For example, extensions to a virtualization system may be used to support invocation of a callback when monitored code is executed.

Further still, as shown in decision 408, it is determined whether a callback is within a scope of the monitoring. In one embodiment, it may be determined whether an element of execution (e.g. a thread, etc.) associated with the callback is within the scope of the monitoring. If in decision 408 it is determined that the callback is not within the scope of the monitoring, then monitoring of callbacks is again invoked in operation 406.

However, if in decision 408 it is determined that the callback is within the scope of the monitoring, then in operation 410, a call stack for the operation that triggered the monitoring callback is extracted and examined. In one embodiment, examining the call stack may include performing an extended call stack analysis on the call stack. Additionally, as shown in operation 412, additional monitoring is enabled as indicated by the examination of the call stack. For example, enabling the additional monitoring may include placing one or more additional monitoring points (e.g., hooks, probes, etc.) in the call stack or the freed memory in the call stack. In one embodiment, the additional monitoring may include dynamically adjusted monitoring. In this way, a more comprehensive view of call stack frames not visible from the callbacks of the initial level of monitoring may be provided.

Further, as shown in decision 414, it is determined whether a subsequent test event is needed. For example, it may be determined whether the additional monitoring that was enabled in operation 412 constitutes one or more subsequent test events. If it is determined in decision 414 that a subsequent test event is needed, then monitoring of callbacks is again invoked in operation 406. However, if in it is determined in decision 414 that a subsequent test event is not needed, then in operation 416 the additional monitoring enabled in operation 412 is disabled. In this way, test event monitoring may conclude, and any additional monitoring points used during the monitoring may be reused in a dynamic manner. Additionally, the scope of test event monitoring may be selectively enabled and controlled.

Figure 5:
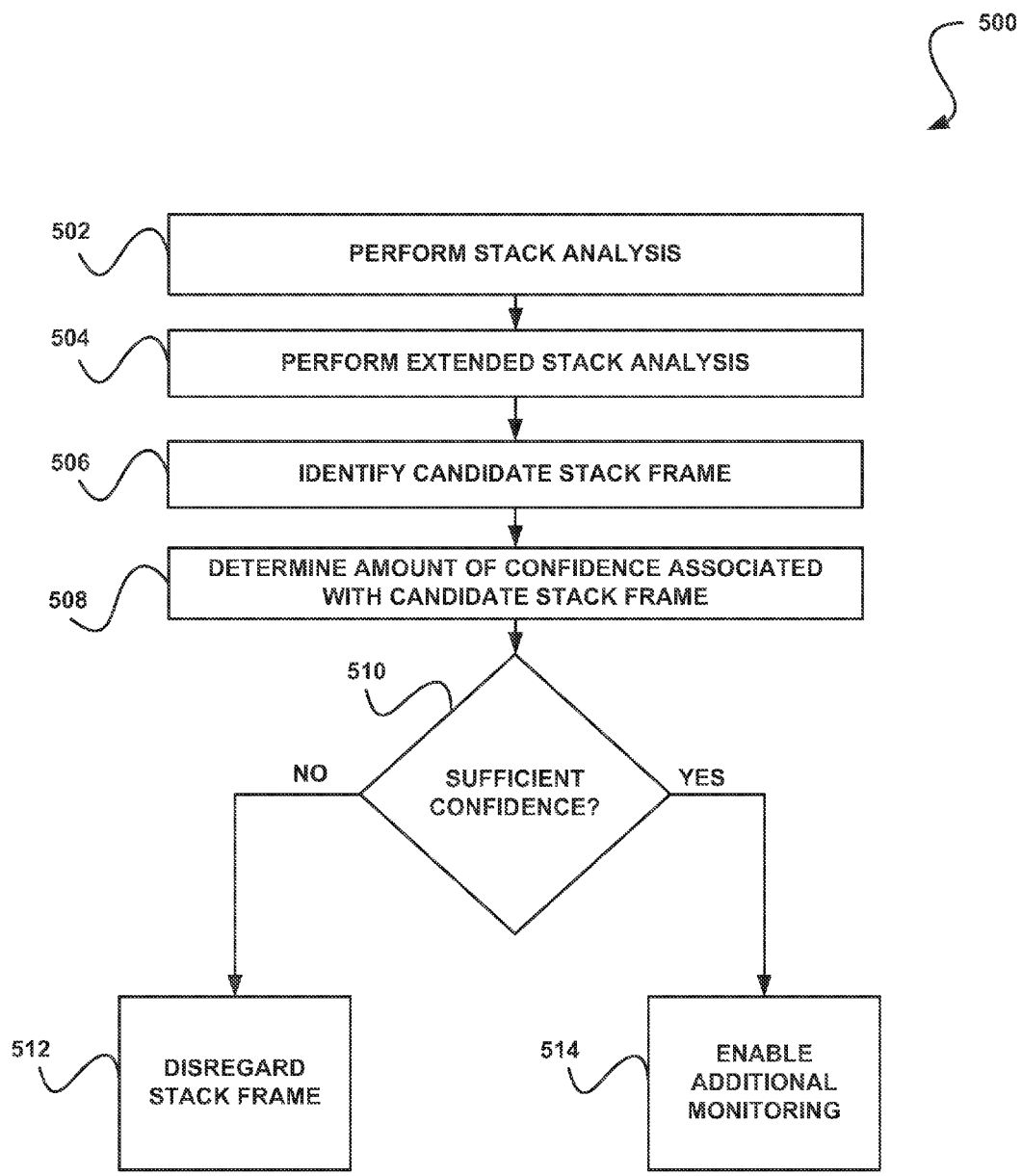
FIG. 5 shows a method for performing extended call stack analysis, in accordance with still another embodiment.

FIG. 5 shows a method 500 for performing extended call stack analysis, in accordance with another embodiment. As an option, the method 500 may be carried out in the context of the architecture and environment of FIGS. 1-4. Of course, however, the method 500 may be carried out in any desired environment.

As shown in operation 502, stack analysis of a call stack is performed. In one embodiment, performing the stack analysis may include identifying one or more call frames of the call stack by performing a stack walk. For example, stack frames may be discovered by walking back in the stack when stack frame pointers are not present. Additionally, see, for example, U.S. patent application Ser. No. 11/749,635 filed May 16, 2007, which is hereby incorporated by reference in its entirety, and which describes behavioral stack walking. In another embodiment, performing the stack analysis may include extracting a call return address from an identified call frame. Further, in yet another embodiment, performing the stack analysis may include identifying an origin of code containing the return address.

Additionally, as shown in operation 504, extended call stack analysis is performed. In one embodiment, performing extended call stack analysis may include identifying a current top of the call stack. For example, the call stack may grow from top to bottom as functions are called, and may shrink from bottom to top as functions return. In another embodiment, performing extended call stack analysis may include moving through freed stack memory. In yet another embodiment, such freed stack memory may be analyzed in an attempt to identify one or more preserved call stack frames in the freed stack memory.

Also, in one embodiment, the extended call stack analysis may examine freed stack memory due to the fact that freeing of stack memory does not necessarily overwrite its contents. Additionally, stack memory may not be deallocated upon freeing. Instead, the stack pointer may be simply moved to make the freed stack memory unavailable via normal stack usage, and the stack data may be preserved unless overwritten later. In another embodiment, even if the stack does grow back over the memory it may not all be overwritten (e.g., if memory is reserved but not used, etc.).

Further, as shown in operation 506, a candidate stack frame is identified as a result of the extended call analysis. For example, a candidate stack frame may be selected from the freed stack memory. Further still, as shown in operation 508, an amount of confidence associated with the candidate stack frame is determined. In one embodiment, a suspected call return address may be extracted from the candidate call stack frame. Additionally, in another embodiment, it may be determined whether the suspected call return address points to code. Further, in yet another embodiment, the code pointed to by the suspected call return address may be analyzed. For example, the code may be examined for a preceding call that may explain the invocation of the candidate stack frame. For instance, the preceding call may be a call to the candidate stack frame, another stack frame, etc.

Further still, in another embodiment, it may be determined whether the candidate stack frame includes a stack frame link. For example, it may be determined whether the candidate stack frame contains a link (e.g., a pointer, etc.) to another stack frame. In yet another embodiment, extended call stack analysis may be performed on a stack frame linked to by the stack frame link of the candidate stack frame. In this way, analysis may be repeated on additional potentially linked stack frames.

In yet another embodiment, an aggregate of the aforementioned analysis may determine a level of confidence associated with the candidate stack frame. For example, the level of confidence may be associated with a determination of whether the candidate call stack frame is genuine. For example, if it is determined that a suspected call return address points to code, and the code includes a call to the candidate stack frame, a high level of confidence may be associated with the candidate stack frame. Additionally, in another example, if the candidate stack frame contains a link to another stack frame, and the other stack frame can be verified, then a high level of confidence may be associated with the candidate stack frame.

Also, as shown in decision 510, it is determined whether a sufficient amount of confidence is associated with the candidate stack frame. In one embodiment, the amount of confidence associated with the candidate stack frame may be compared to a threshold amount, and the amount of confidence associated with the candidate stack frame may be determined to be sufficient if such amount is greater than the threshold amount. In another embodiment, the threshold amount may be dynamically determined, predetermined by a user, etc.

In addition, if it is determined in decision 510 that a sufficient amount of confidence is not associated with the candidate stack frame, then in operation 512 the candidate stack frame is disregarded. However, if in decision 510 it is determined that a sufficient amount of confidence is associated with the candidate stack frame, then in operation 514 additional monitoring is placed in order to validate the candidate stack frame. Also, the additional monitoring may allow for observation of additional transient call stack frames. In another embodiment, a secondary test event may be created, and it may be determined whether the additional monitoring points are triggered in the secondary test event.

In one embodiment, one or more additional monitoring points may be placed in association with the candidate stack frame. In another embodiment, the targets of additional monitoring may be determined in a multitude of ways. In one example, monitoring may be placed within code pointed to by the suspected call return address, and it may be determined whether the candidate stack frame is created when the secondary test event is processed. For instance, code preceding a call return address extracted from the candidate stack frame may be examined. In another example, the examination may not stop at the first call identified, but may continue for more of the code preceding the return address. Additionally, the examination may also go forward from the return address to identify other monitoring points.

In another embodiment, execution monitoring may be performed on the maker of the call, or the target of the call. Performing execution monitoring on the target of the call may allow for more code paths to be covered by a single execution monitor, which may prove beneficial if a number of allowed monitors is limited (e.g., in CPU debugging extensions, etc.). In yet another embodiment, the targets of additional monitoring may be determined by the identification of a body of code associated with an observed call frame. For example, code that is part of an interface may be identified through stack analysis as having been invoked.

In one embodiment, in cases where a chain of calls is made and then rolled directly back as the called functions return, the stack data may be entirely preserved for analysis. Additionally, in another embodiment, if in the midst of the rollback additional calls were made, portions of the earlier stack data may be overwritten as the stack grows back down. Also, on return from these functions, the stack data from their invocation may be preserved instead of the earlier data.

Therefore, assembling an execution may require monitoring from several points in order to put together a picture of transient call stacks. This may include dynamically adjusting monitoring points in order to better capture stack frames and validate stack frame candidates identified within the extended stack analysis. In this way, dynamically adjusted systems monitoring, particularly when combined with the use of test events, may allow for heightened monitoring that may mitigate a performance impact. Additionally, dynamically applied execution monitoring may result from the stack analysis as well as the extended analysis. For example, with stack analysis, the stack grown and shrinks as call chains are made and then rolled back, and applying additional monitoring may allow viewing of these transient call stack states.

In this way, forensic analysis may be used to discover call stack frames from data left in freed stack memory. Additionally, a combination of call stack analysis and extended call stack analysis may be used to assemble a picture of an execution flow of a handling of one or more test events. Further, a variety of base enabling technologies may be used to provide a generation of data for analysis. Further still, dynamically applied monitoring may be used to assemble a more complete picture of an execution flow and may be used to mitigate an impact of a monitoring system.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. One or more non-transitory computer readable media comprising instructions stored thereon that when executed by a programmable device cause the programmable device to:
   identify data associated with a function within a call stack;
   determine a former call stack frame from an area of memory outside the call stack, wherein the former call stack frame includes memory that was previously popped off the call stack; and
   monitor an execution flow of the function by monitoring the former call stack frame.

2. The one or more non-transitory computer readable media of claim 1, wherein the function is associated with an instance of software.

3. The one or more non-transitory computer readable media of claim 1, wherein the data includes an entry in the call stack.

4. The one or more non-transitory computer readable media of claim 3, wherein the entry includes a return address that identifies a function that pushed the entry onto the call stack.

5. The one or more non-transitory computer readable media of claim 1, wherein the data is identified within the call stack as a result of generating a test event.

6. The one or more non-transitory computer readable media of claim 1, wherein the data associated with the function is identified by monitoring the call stack.

7. The one or more non-transitory computer readable media of claim 1, wherein hooking based monitoring of the call stack is used to identify the data associated with the function.

8. The one or more non-transitory computer readable media of claim 1, wherein the former call stack frame includes memory below a stack pointer associated with the call stack.

9. The one or more non-transitory computer readable media of claim 1, wherein a monitoring point is placed on the call stack frame.

10. The one or more non-transitory computer readable media of claim 9, wherein the monitoring point identifies code for handling a test event.

11. The one or more non-transitory computer readable media of claim 1, wherein the monitoring of the execution flow of the function is dynamically adjusted, based on the former call stack frame.

12. The one or more non-transitory computer readable media of claim 1, wherein monitoring the execution flow of the function includes enabling additional monitoring, based on an analysis of the former call stack frame.

13. The one or more non-transitory computer readable media of claim 1, further comprising instructions that when executed cause the programmable device to determine whether the former call stack frame has been overwritten by a second call stack entry subsequent to a first call stack entry in the former call stack frame.

14. The one or more non-transitory computer readable media of claim 1, wherein a level of confidence associated with the former call stack frame is determined.

15. The one or more non-transitory computer readable media of claim 14, further comprising instructions that when executed cause the programmable device to determine whether the former call stack frame is compromised, based on the level of confidence.

16. A method, comprising:
- identifying data associated with a function within a call stack;
- determining a former call stack frame from an area of memory outside the call stack, wherein the former call stack frame includes memory that previously held an active call stack entry; and
- monitoring an execution flow of the function by monitoring the former call stack frame.

17. A system, comprising:
- a processor; and
- a non-transitory computer readable medium comprising instructions stored thereon that when executed configure the processor to:
  - identify data associated with a function within a call stack,
  - determine a former call stack frame from an area of memory outside the call stack, wherein the former call stack frame includes memory that previously held an active stack entry, and
  - monitor an execution flow of the function by monitoring the former call stack frame.

18. The system of claim 17, wherein the function is associated with an instance of software.

* * * * *